United States Patent
Witt et al.

(10) Patent No.: US 10,546,196 B2
(45) Date of Patent: Jan. 28, 2020

(54) SEMANTIC PLACE RECOGNITION AND LOCALIZATION

(71) Applicant: X Development LLC, Mountain View, CA (US)

(72) Inventors: Jonas Witt, Palo Alto, CA (US); Elmar Mair, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 99 days.

(21) Appl. No.: 15/848,527

(22) Filed: Dec. 20, 2017

(65) Prior Publication Data

US 2019/0188473 A1    Jun. 20, 2019

(51) Int. Cl.
| | | |
|---|---|---|
| G06K 9/00 | (2006.01) | |
| G06K 9/62 | (2006.01) | |
| G01S 17/42 | (2006.01) | |
| G01S 17/89 | (2006.01) | |

(52) U.S. Cl.
CPC .......... *G06K 9/00671* (2013.01); *G01S 17/42* (2013.01); *G01S 17/89* (2013.01); *G06K 9/6219* (2013.01); *G06K 9/6267* (2013.01)

(58) Field of Classification Search
None
See application file for complete search history.

(56) References Cited

U.S. PATENT DOCUMENTS

| | | |
|---|---|---|
| 8,214,079 B2 | 7/2012 | Lee et al. |
| 8,396,254 B1 | 3/2013 | Hickman |
| 8,432,443 B2 | 4/2013 | Nam et al. |
| 9,129,148 B1 | 9/2015 | Li et al. |
| 9,574,883 B2 | 2/2017 | Watts et al. |
| 9,751,212 B1 | 9/2017 | Martinson et al. |

(Continued)

OTHER PUBLICATIONS

'www.qualcomm.com' [online] "Finding Objects in Cluttered Scenes for Home Robotics," Jim Little, Presentation in Laboratory for Computational Intelligence Computer Science, UBC Vancouver, [retrieved on Dec. 19, 2017] Retrieved from Internet: URL<https://www.qualcomm.com/media/ . . . /augmented-reality-lecture-series-jim-little.pdf> 91 slides.

(Continued)

*Primary Examiner* — David Perlman
(74) *Attorney, Agent, or Firm* — Fish & Richardson P.C.

(57) ABSTRACT

Methods, systems, and apparatus for receiving data that represents a portion of a property that was obtained by a robot, identifying, based at least on the data, objects that the data indicates as being located within the portion of the property, determining, based on the objects, a semantic zone type corresponding to the portion of the property, accessing a mapping hierarchy for the property, wherein the mapping hierarchy for the property specifies semantic zones of the property that have corresponding semantic zone types and are associated with locations at the property, and specifies characteristics of the semantic zones, and selecting, from among the semantic zones and based at least on the semantic zone type and the data, a particular semantic zone, and setting, as a current location of the robot at the property, a particular location at the property associated with the particular semantic zone.

20 Claims, 4 Drawing Sheets

(56) References Cited

U.S. PATENT DOCUMENTS

| | | | |
|---|---|---|---|
| 2008/0002916 A1* | 1/2008 | Vincent | G06K 9/3258 |
| | | | 382/305 |
| 2014/0161360 A1 | 6/2014 | Cao et al. | |
| 2016/0275350 A1 | 9/2016 | Raynaud et al. | |
| 2017/0249504 A1 | 8/2017 | Martinson et al. | |

OTHER PUBLICATIONS

Althaus et al. "Behavior coordination in structured environments," Advanced Robotics, vol. 17 (7), Jan. 1, 2003, 19 pages.

Anati, "Semantic Localization and Mapping in Robot Vision," University of Pennsylvania, Scholarly Commons, Publicly Accessible Penn Dissertations, 1587, Jan. 1, 2016, 172 pages.

Biswas et al. "Depth camera based indoor mobile robot localization and navigation," IEEE International Conference on Robotics and Automation, May 14, 2012, 7 pages.

Buschka et al. "A Virtual Sensor for Room Detection," IEEE/RSJ International Conference on Intelligent Robots and Systems, vol. 1, 2002, 6 pages.

Cadena et al. "Past, Present, and Future Simultaneous Localization and Mapping: Towards the Robust-Perception Age," arXiv 1606.05830v4, Jan. 30, 2017, 25 pages.

Fuentes-Pacheco et al. "Visual simultaneous localization and mapping: a survey," Artificial Intelligence Review, vol. 43(1) Jan. 2015, 27 pages.

Koenig et al. "Xavier: A robot navigation architecture based on partially observable markov decision process models," Artificial Intelligence Based Mobile Robotics: Case Studies of Successful Robot Systems, May 1, 1998, 24 pages.

Kuipers et al. "Bootstrap Learning for Place Recognition," In Proceedings of the 18th National Conference on Artificial Intelligence, Jul. 2002, 7 pages.

Lam et al. "An Efficient Hierarchical Localization for Indoor Mobile Robot with Wireless Sensor and Pre-Constructed Map," Proceedings of the $5^{th}$ International Conference on Ubiquitous Robots and Ambient Intelligence, Nov. 2008, 6 pages.

Mozos, "Semantic Labeling of Places with Mobile Robots," vol. 61, Heidelberg: Springer, Feb. 4, 2010, 176 pages.

Murtra et al. "Efficient Use of 3D Environment Models for Mobile Robot Simulation and Localization," SIMPAR, Nov. 15, 2010, 12 pages.

Pronobis et al. "A realistic benchmark for visual indoor place recognition," Robitcs and Autonomous Systems vol. 58(1), Jan. 31, 2010, 17 pages.

Pronobis et al. "Multi-modal Semantic Place Classification," The International Journal of Robotics Research vol. 29(2-3) Feb. 2010, 24 pages.

Ribes et al. "Object-based Place Recognition for Mobile Robots Using Panoramas," Proceedings of the 11th International Conference of the Catalan Association for Artificial Intelligence, Bol. 184, Oct. 15, 2008, 8 pages.

Rottmann et al. "Semantic Place Classification of Indoor Environments with Mobile Robots using Boosting," AAAI vol. 5, Jul. 9, 2005, 6 pages.

Se et al. "Vision-Based Global Localization and Mapping for Mobile Robots," IEEE Transactions on robotics, 21.3, Jun. 2005, 12 pages.

Siagian et al. "Autonomous Mobile Robot Localization and Navigation using Hierarchical Map Representations Primarily Guided by Vision," Journal of Field Robotics, vol. 31(3), May 1, 2014, 43 pages.

Siagian et al. "Biologically inspired mobile robot vision localization," IEEE Transactions on Robotics, vol. 25(4), Aug. 2009, 13 pages.

Siegwart et al. "Chapter 5: Mobile Robot Localization," Introduction to Autonomous Mobile Robots, A Bradford Book, The MIT Press, 2004, 144 pages.

Sonderman et al. "Improved mobile robot localization using semantic world models," in Proceedings of the $13^{th}$ Symposium on Advanced Space Technologies in Robotics and Automation, May 2015, 7 pages.

Torralba et al. "Context-based Vision system for place and object recognition," IEEE, Null., Oct. 13, 2003, 8 pages.

Vasudevan et al. "Cognitive Maps for Mobile Robots," Robotics and Autonomous Systems, 55, Jan. 2007, 13 pages.

Zhang et al. "Localization Based on Building Recognition," IEEE Computer Society Conference on Computer Vision and Pattern Recognition—Workshops, Jun. 2005, 8 pages.

PCT International Search Report and Written Opinion in International Appln. No. PCT/US2018065477, dated Apr. 1, 2019, 17 pages.

* cited by examiner

SEMANTIC PLACE RECOGNITION AND LOCALIZATION

TECHNICAL FIELD

This application relates generally to robotic mapping and localization.

BACKGROUND

Robotic mapping concerns the creation and use of property mappings by autonomous robots. A property can be represented using two-dimensional (2D) floor plan mapping or a three-dimensional (3D) space mapping that provides a 3D representation of the interior of the property. Property mappings may be metric representations, in which structures and objects within the property are associated with coordinate locations or boundaries, or may be topological representations in which structures and objects are defined based on relationships between them, such as the distances and angles between the various objects and boundaries within the property. Property mappings may represent the free space within a property, i.e., the areas of the property where an autonomous robot is permitted to move, may represent objects within a property, i.e., the areas of the property that are occupied by other structures or objects and therefore represent where an autonomous robot is not permitted to move, or may be composite mappings that represent both the free space and objects within a property.

Autonomous robots utilize property mappings to perform path planning and navigation within a property. Given a location of the autonomous robot within the property and a location of a destination within the property, the autonomous robot can plan a path to navigate through the property to its destination. In some instances, a robot's location within a property can be provided to the autonomous robot, for example, by another system or a human user. In other implementations, an autonomous robot performs localization to determine its location within the property. Localization is traditionally performed, for example, by determining the proximity of the autonomous robot to one or more proximity beacons, using near-field communication NFC), based on detecting a particular wireless free internet (WiFi) network or the strength of a particular WiFi network, using visible light communication (VLC), or based on detecting a particular Bluetooth connection or strength of Bluetooth connection.

SUMMARY

This specification relates to techniques for performing place recognition and localization, and one particular application of these techniques enables autonomous robots to perform place recognition and localization based on information obtained from its current location. Generally, place recognition refers to capabilities for determining a type of semantic zone that describes an intended primary purpose of a space. For example, different spaces within a home may be designated as have different semantic zone types, such as kitchens, bedrooms, bathrooms, dining rooms, hallways, garages, and the like. Localization refers to the ability to determine a precise location within a property, such as specific coordinates within a mapping of a home.

As used in this specification, a property generally refers to a physical space that is capable of being mapped, such as a space that has two or more semantically distinct regions (e.g., an office, warehouse, factory, or residence having multiple rooms). While the present disclosure focuses on implementations in which place recognition and localization are performed within buildings or similar indoor properties, similar techniques can be utilized to perform place recognition and localization outside of buildings, such as in parks, on farms, in cities, or in any number of other properties. Moreover, while the present disclosure focuses on techniques for enabling place recognition and localization by autonomous robots, these techniques may be useful in other contexts as well, such as in surveillance or security applications that may not utilize autonomous robots.

Place recognition and localization are frequently encountered challenges in applications relating to autonomous robots. For example, localization is essential when autonomous robots are performing simultaneous localization and mapping (SLAM). SLAM generally refers to instances in which an autonomous robot obtains information to construct or update a mapping of a property, while simultaneously tracking its own location within the property.

When performing SLAM, an autonomous robot must maintain an awareness of its physical location in the world, for example, its latitude and longitude or its coordinates within a grid representation of a property, while simultaneously obtaining measurements or other information to generate or update a mapping of the property. Inaccuracy in determining the physical location of the autonomous robot will result in those errors being propagated to the mapping of the property being generated based on the measurements taken by the autonomous robot. For example, a robot measuring the distance to and positioning of a wall using light detection and ranging (LIDAR) must have an accurate understanding of its current location to accurately map the location of the wall within the property based on those measurements.

Place recognition and localization also poses a difficult problem when an autonomous robot is placed in an unknown location. Known as the "kidnapped robot problem," it is generally difficult for an autonomous robot to perform localization based on limited information or without knowledge of its prior locations. For example, when an autonomous robot is powered on in an unknown location or suffers a malfunction of its localization system, the robot may attempt to bootstrap or otherwise determine its location in the world based on new information that it can obtain.

For example, autonomous robots may be able to use NFC capabilities, WiFi network detection, or other information to estimate its location within a property, but may have difficulty in determining its exact coordinates within the property. The autonomous robot may attempt to resolve its location further by using cameras, LIDAR, sonar, radar, stereo cameras, or other sensors to determine, for example, its position relative to a wall that the autonomous robot determines it is proximate to within a mapping of the property. Failure to accurately resolve the location of the autonomous robot within the property can limit its ability to perform accurate path planning and navigation within the property.

To address these problems, the proposed system utilizes place and object recognition in conjunction with a mapping hierarchy to improve the accuracy and efficiency of localization. The system maintains, for a property represented using a 2D or 3D mapping, a mapping hierarchy for the property. The mapping hierarchy specifies one or more semantic zones of the property that each have a corresponding semantic zone type as well as an associated location within the property. Each semantic zone of the property is also associated with one or more characteristics of the semantic zone, where characteristics of a semantic zone may include, for example, objects that are within the semantic zone, shapes of objects within the semantic zone, the positioning of objects relative to one-another within the semantic zone, dimensions or colors of objects or barriers within the semantic zone, or other characteristics that can be used to distinguish two semantic zones of the same type.

To perform localization, an autonomous robot receives information that represents a portion of a property where the autonomous robot is located. Using this information, the autonomous robot determines one or more objects that are within the portion of the property where the autonomous robot is located. The autonomous robot uses the one or more objects to determine a particular semantic zone type corresponding to the portion of the property depicted by the information. The system then accesses the mapping hierarchy for the property and searches the mapping hierarchy for a semantic zone of the property that is of the particular semantic zone type. Upon locating a particular semantic zone of the particular semantic zone type in the mapping hierarchy, the system can select the semantic zone as the semantic zone where the autonomous robot is currently located. To complete localization of the autonomous robot, the system assigns a location within the property associated with the particular semantic zone as the current location of the autonomous robot.

For example, an autonomous robot that is attempting to perform localization may obtain one or more images from its position within a property. The autonomous robot can analyze the one or more images and determine that the images depict a refrigerator and a sink. Based on determining that the one or more images represent a refrigerator and sink, the autonomous robot can determine that the portion of the property depicted by the images is of a kitchen semantic zone type, since refrigerators and sinks are more likely to be found in kitchens than in other rooms of a building. The autonomous robot can then access and search a mapping hierarchy of the property for a semantic zone that is assigned a kitchen semantic zone type. Upon locating a kitchen semantic zone in the mapping hierarchy, the autonomous robot can set a location associated with the kitchen semantic zone specified by the mapping hierarchy as the current location of the autonomous robot.

In instances where there are multiple semantic zones of a particular semantic zone type represented in a mapping hierarchy, the system can use the information obtained by the autonomous robot to determine specific characteristics of the portion of the property where the robot is located. The system can select a particular semantic zone from among the multiple semantic zones of the particular semantic zone type based on these characteristics. For example, if an autonomous robot determines a kitchen semantic zone type but a mapping hierarchy of a property includes two kitchen semantic zones, the autonomous robot may determine a shape or color of a refrigerator and use those characteristics to select a particular kitchen where the autonomous robot is likely located.

In some implementations, the information obtained by the autonomous robot may be insufficient to resolve a particular semantic zone type or semantic zone from the mapping hierarchy. In those cases, the autonomous robot can obtain additional information, such as additional images, from where the autonomous robot is located within the property. The system can use the additional information to further resolve the semantic zone type or semantic zone to determine a location of the autonomous robot within the property.

Innovative aspects of the subject matter described in this specification may be embodied in methods, systems, and computer-readable devices storing instructions configured to perform the actions of receiving data that represents a portion of a property and that was obtained using one or more sensors of a robot while located at a particular position of the property, identifying, based at least on the data that represents the portion of the property and that was obtained using the one or more sensors of the robot while located at the particular position of the property, one or more objects that the data indicates as being located within the portion of the property, determining, based at least on the one or more objects that the data indicates as being located within the portion of the property, a semantic zone type corresponding to the portion of the property, accessing a mapping hierarchy for the property, wherein the mapping hierarchy for the property specifies one or more semantic zones of the property that each have a corresponding semantic zone type and that are each associated with a location at the property, and specifies, for each of the one or more semantic zones of the property, one or more characteristics of the semantic zone of the property, and selecting, from among the one or more semantic zones of the property specified by the mapping hierarchy and based at least on the semantic zone type corresponding to the portion of the property and at least a portion of the data that represents the portion of the property and that was obtained using the one or more sensors of the robot while located at the particular position of the property, a particular semantic zone of the property specified by the mapping hierarchy, and setting, as a current location of the robot at the property, a particular location at the property associated with the particular semantic zone of the property specified by the mapping hierarchy.

These and other embodiments may each optionally include one or more of the following features. In various examples, the data that represents the portion of the property and that was obtained using the one or more sensors of the robot while located at the particular position of the property comprises one or more images of the portion of the property; the data that represents the portion of the property and that was obtained using the one or more sensors of the robot while located at the particular position of the property comprises a plurality of LIDAR measurements obtained from the portion of the property.

These and other embodiments may also each include one or more of the following features. In various examples, determining the semantic zone type corresponding to the portion of the property comprises determining that the one or more objects that the data indicates as being located within the portion of the property is insufficient to determine a semantic zone type corresponding to the portion of the property receiving additional data that represents a different portion of the property and that was obtained using the one or more sensors of the robot while located at the particular position of the property, identifying, based at least on the additional data that represents the different portion of the property and that was obtained using the one or more sensors of the robot while located at the particular position of the property, one or more additional objects that the additional data indicates as being located within the different portion of the property, and determining, based at least on the one or more objects that the data indicates as being located within the portion of the property and the one or more additional objects that the data indicates as being located within the different portion of the property, the semantic zone type corresponding to the portion of the property.

These and other embodiments may each also include one or more of the following features. In various examples, selecting the particular semantic zone of the property specified by the mapping hierarchy comprises, comparing the semantic zone type corresponding to the portion of the property to the semantic zone types corresponding to each of the one or more semantic zones of the property specified by the mapping hierarchy, and determining that the semantic zone type corresponding to the portion of the property matches a semantic zone type corresponding to the particular semantic zone of the property specified by the mapping hierarchy.

These and other embodiments may also each include one or more of the following features. In various examples, selecting the particular semantic zone of the property specified by the mapping hierarchy comprises determining that the mapping hierarchy specifies multiple semantic zones of the property that are of the semantic zone type corresponding to the portion of the property, in response to determining that the mapping hierarchy specifies multiple semantic zones of the property that are of the semantic zone type corresponding to the portion of the property, determining one or more characteristics of the portion of the property based on the data that represents the portion of the property and that was obtained using the one or more sensors of the robot while located at the particular position of the property, comparing the one or more characteristics of the portion of the property to the one or more characteristics of each of the multiple semantic zones of the property that are of the semantic zone type corresponding to the portion of the property, and determining, based at least on comparing the one or more characteristics of the portion of the property to the one or more characteristics of each of the multiple semantic zones of the property that are of the semantic zone type corresponding to the portion of the property, that one or more characteristics of the portion of the property correspond to one or more characteristics of a particular semantic zone of the property that is of the semantic zone type corresponding to the portion of the property; determining that one or more characteristics of the portion of the property correspond to one or more characteristics of the particular semantic zone of the property that is of the semantic zone type corresponding to the portion of the property comprises determining that the one or more characteristics of the portion of the property correspond to one or more characteristics of the particular semantic zone of the property that is of the semantic zone type corresponding to the portion of the property and correspond to one or more characteristics of each of one or more other semantic zones of the property that are of the semantic zone type corresponding to the portion of the property, receiving additional data that represents a different portion of the property and that was obtained using the one or more sensors of the robot while located at the particular position of the property, determining one or more characteristics of the different portion of the property based on the additional data that represents the different portion of the property and that was obtained using the one or more sensors of the robot while located at the particular position of the property, comparing the one or more characteristics of the portion of the property and the one or more characteristics of the different portion of the property to the one or more characteristics of each of the multiple semantic zones of the property that are of the semantic zone type corresponding to the portion of the property, and determining, based at least on comparing the one or more characteristics of the portion of the property and the one or more characteristics of the different portion of the property to the one or more characteristics of each of the multiple semantic zones of the property that are of the semantic zone type corresponding to the portion of the property, that one or more characteristics of the portion of the property and one or more characteristics of the different portion of the property correspond to one or more characteristics of the particular semantic zone of the property that is of the semantic zone type corresponding to the portion of the property.

These and other embodiments may each also include one or more of the following features. In various examples, the one or more characteristics of each of the one or more semantic zones of the property comprise one or more objects located in each of the one or more semantic zones of the property; selecting the particular semantic zone of the property specified by the mapping hierarchy comprises comparing the one or more objects that the data indicates as being located within the portion of the property to the one or more objects located in each of the one or more semantic zones of the property, and determining that one or more of the objects that the data indicates as being located within the portion of the property corresponds to one or more objects located in the particular semantic zone of the property specified by the mapping hierarchy.

These and other embodiments may each also include one or more of the following features. In various examples, the one or more characteristics of each of the one or more semantic zones of the property comprise one or more characteristics of three-dimensional representations of each of the one or more semantic zones of the property; selecting the particular semantic zone of the property specified by the mapping hierarchy comprises determining, based at least on the data that represents the portion of the property and that was obtained using the one or more sensors of the robot while located at the particular position of the property, a three-dimensional representation of the portion of the property, comparing one or more characteristics of the three-dimensional representation of the portion of the property to the one or more characteristics of the three-dimensional representations of each of the one or more semantic zones of the property, and determining that one or more characteristics of the three-dimensional representation of the portion of the property corresponds to one or more characteristics of the three-dimensional representation of the particular semantic zone of the property specified by the mapping hierarchy.

The details of one or more embodiments of the subject matter described in this specification are set forth in the accompanying drawings and the description below. Other potential features, aspects, and advantages of the subject matter will become apparent from these description, the drawings, and the claims.

BRIEF DESCRIPTION OF THE DRAWINGS

Like reference symbols in the various drawings indicate like elements.

DETAILED DESCRIPTION

Figure 1A:
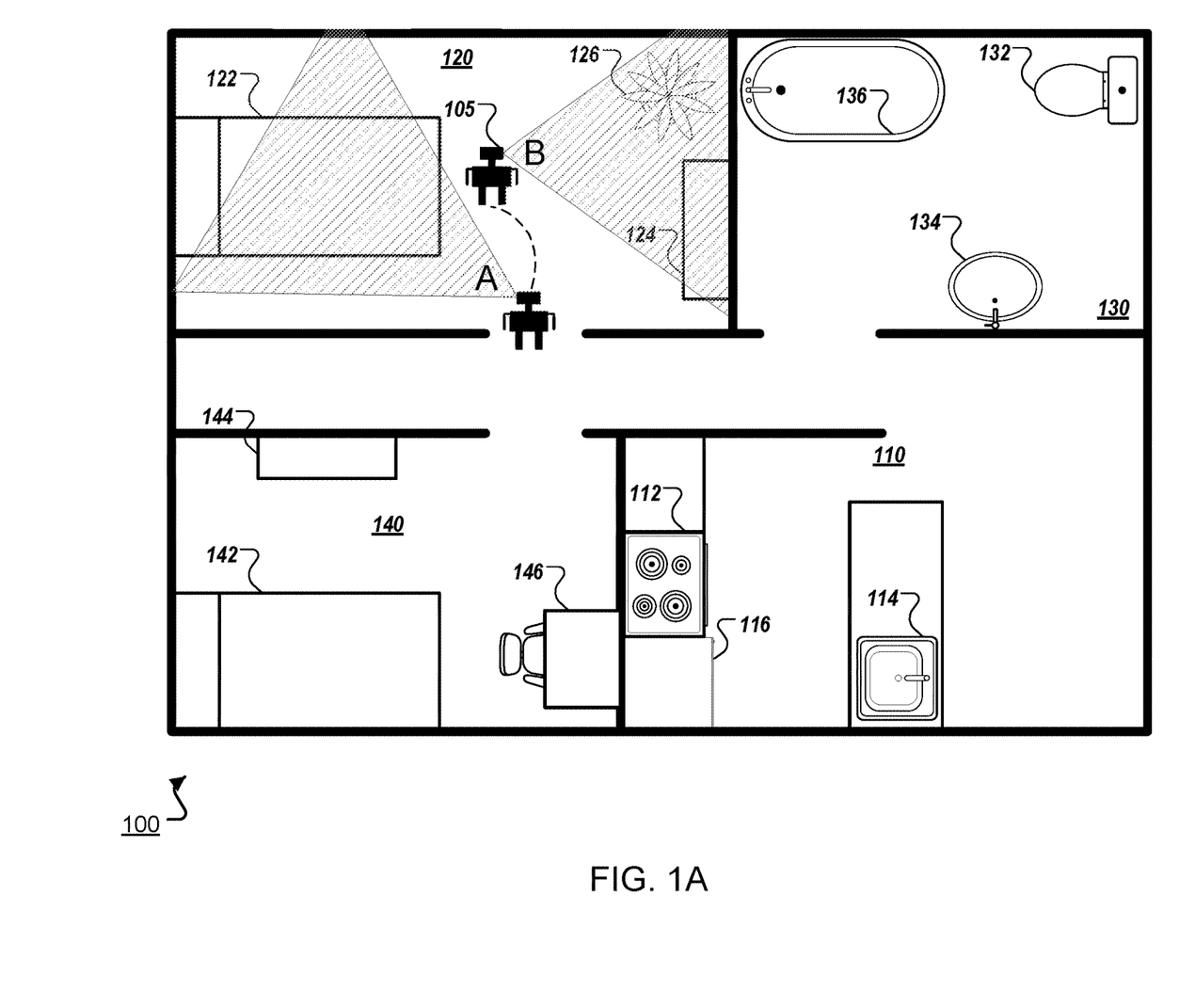
FIG. 1A depicts an example property in which an autonomous robot is performing place recognition and localization.

FIG. 1A depicts an example property 100 including an autonomous robot 105 that is configured to perform place recognition and localization. The property 100 may be represented in a mapping, such as a 2D floor plan or 3D space mapping that describes the interior of the property 100. To determine its location within the property 100, the autonomous robot 105 may obtain information using one or more sensors that are included in the autonomous robot 105. For example, the autonomous robot 105 may include a camera that is configured to obtain images of portions of the property 100 while the autonomous robot is located at a particular position of the property 100.

Figure 1B:
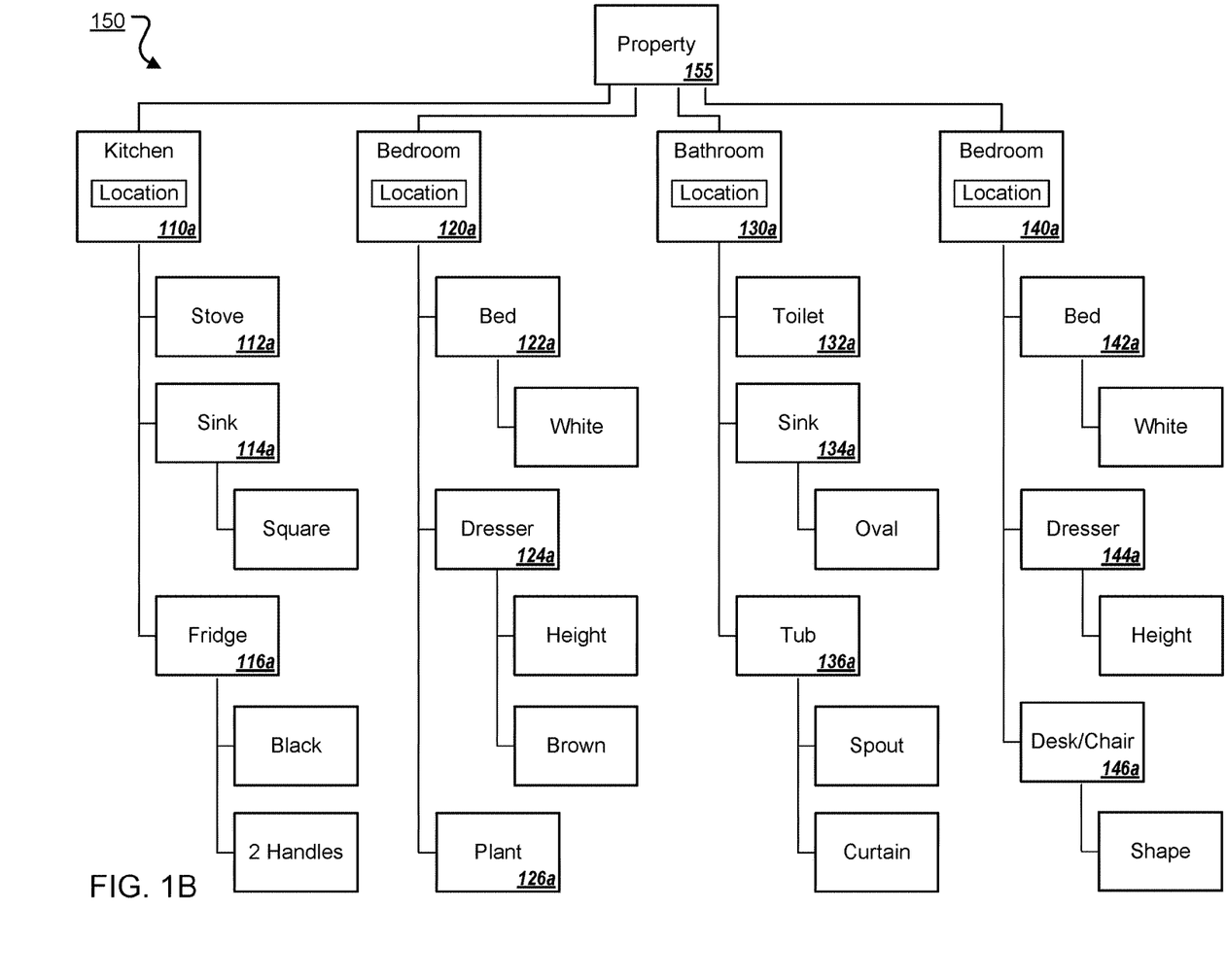
FIG. 1B depicts a representation of an example mapping hierarchy for a property.

FIG. 1B depicts an example mapping hierarchy 150 that specifies semantic zones of the property 100 and characteristics of the semantic zones of the property 100. For example, as shown in FIG. 1A, the kitchen semantic zone 110 of the property 100 includes a stove 112, sink 114, and refrigerator 116. The mapping hierarchy 150 includes a head node 155 representing a top layer of the mapping hierarchy 150 of the property 100. Under the head node 155, the mapping hierarchy 150 includes a second level that includes a node 110a corresponding to the kitchen semantic zone 110. At a third level, the mapping hierarchy 150 includes a node 112a corresponding to the stove 112 of the property 100, a node 114a corresponding to the sink 114, and a node 116a corresponding to the refrigerator 116. A fourth level of the mapping hierarchy 150 describes characteristics of the objects located within the kitchen semantic zone 110 of the property 100. For example, the mapping hierarchy 150 may specify that the sink 114 has a square shape, and that the refrigerator 116 is black and has two handles.

The mapping hierarchy 150 includes similar structure corresponding to other semantic zones within the property 100. Specifically, the property 100 includes a first bedroom semantic zone 120, and the mapping hierarchy 150 includes a corresponding node 120a at the second level of the mapping hierarchy 150 corresponding to the first bedroom semantic zone 120. The first bedroom semantic zone 120 includes a bed 122 represented in the third level of the mapping hierarchy 150 as the node 122a, a dresser 124 represented as the node 124a in the mapping hierarchy 150, and a plant 126 represented by the node 126a in the mapping hierarchy 150. The fourth level of the mapping hierarchy 150 specifies exemplary characteristics of the objects located in the first bedroom semantic zone 120, for instance, that the bed 122 is white, and that the dresser 124 has a specific height (e.g., measured in feet and inches, meters, etc.) and is brown in color.

The property 100 also includes a bathroom semantic zone 130, which is represented in the mapping hierarchy 150 by the node 130a. The bathroom semantic zone 130 includes a toilet 132 represented by the node 132a, a sink 134 represented by the node 134a, and a tub 136 represented by the node 136a at the third level of the mapping hierarchy 150. The mapping hierarchy 150 specifies characteristics of the objects within the bathroom semantic zone 130, including the oval shape of the sink 134, and describing the spout and curtain of the tub 136.

A second bedroom semantic zone 140 of the property 100 is represented in the mapping hierarchy 150 by the node 140a of the second level of the mapping hierarchy 150. Also represented in the mapping hierarchy 150 are the bed 142 of the second bedroom semantic zone 140, the dresser 144 of the second bedroom semantic zone 140, and a desk and chair 146 that are located within the second bedroom semantic zone 140. As shown in FIG. 1B, the mapping hierarchy 150 also specifies, at its fourth level, characteristics of the objects within the second bedroom semantic zone 140, such as the bed 142 being white in color, a height (e.g., measured in feet and inches, meters, etc.) of the dresser 144, and information specifying the shape (e.g., using a 3D rendering) of the desk and chair 146.

Each of the semantic zones 110, 120, 130, 140 of the property 100 may have an associated location at the property that is specified by the mapping hierarchy 150. The location of each semantic zone 110, 120, 130, 140 may be represented, for example, by coordinates indicating a center of the semantic zone, or the location may be represented as a series of coordinates or other information indicating the boundaries of the semantic zone. The location of each of the semantic zones 110, 120, 130, 140 may be represented in the mapping hierarchy 150 as data linked to, or otherwise associated with, the nodes 110a, 120a, 130a, 140a corresponding to the semantic zones 110, 120, 130, 140.

While shown in FIGS. 1A and 1B as having four semantic zones 110, 120, 130, 140, the property may have additional semantic zones that are not shown, for example, a hallway semantic zone for the space between the various other semantic zones 110, 120, 130, 140, or a semantic zone corresponding to a dining area adjacent to the kitchen semantic zone 110. Moreover, while the mapping hierarchy 150 of FIG. 1B illustrates several characteristics of objects in the mapping hierarchy 150, as discussed with respect to FIG. 2 the mapping hierarchy 150 may include vastly more information relating to each semantic zone 110, 120, 130, 140 or objects within each semantic zone 110, 120, 130, 140.

Returning to FIG. 1A, the autonomous robot 105 may utilize the mapping hierarchy 150 of FIG. 1B to perform place recognition and localization within the property 100. For example, the autonomous robot 105 may have been powered off, and may be turned on while the autonomous robot 105 is located at position (A) of the property 100, within the first bedroom semantic zone 120. Upon startup, the autonomous robot 105 may obtain information to determine its location within the property 100. For example, the autonomous robot 105 may include a camera that is capable of obtaining one or more images of a portion of the property while the autonomous robot 105 is located at position (A) of the property 100.

The autonomous robot 105 may obtain a first image of a portion of the property 100 while located at position (A) of the property. The autonomous robot 105 may process the image to identify one or more objects located within the image. For example, the autonomous robot 105 may include an object recognition engine configured to process the image, or may transmit the image over one or more wired or wireless connections, such as one or more local area networks (LAN) or wide area networks (WAN), to another system that includes an object recognition engine configured to process the image. The object recognition engine may process the image obtained by the autonomous robot 105 to determine one or more objects depicted by the image. For example, the autonomous robot 105 may process the image obtained at position (A) of the property 100 and may identify a bed 122 that is depicted in the portion of the property 100 represented by the image.

The autonomous robot 105 can determine a semantic zone type based on the objects identified from the image obtained from position (A) of the property 100. For example, based on determining that the image depicts a bed 122, the autonomous robot 105 can determine that the portion of the property 100 depicted in the image is of a bedroom semantic zone type. In some implementations, to determine a particular semantic zone type, the autonomous robot 105 can consider multiple different objects that were identified from the information that depicts the portion of a property. For example, some objects, such as a sink or desk and chair, may be common to multiple semantic zone types. In those instances, the autonomous robot 105 may apply scores to the one or more objects identified from the information, and may identify a particular semantic zone type based on the multiple scores.

Having identified the particular semantic zone type, the autonomous robot 105 can access the mapping hierarchy 150. The autonomous robot 105 can search the mapping hierarchy 150 for semantic zones represented in the mapping hierarchy 150 that are of the bedroom semantic zone type. For example, the autonomous robot 105 can determine that the mapping hierarchy 150 includes two nodes 120*a*, 140*a* corresponding to semantic zones of the bedroom semantic zone type, and two other nodes 110*a*, 130*a* corresponding to semantic zones that are not of the bedroom semantic zone type. The autonomous robot 105 can determine, therefore, that it is located in either the first bedroom semantic zone 120 or second bedroom semantic zone 140, based on determining the bedroom semantic zone type.

Having identified two candidate semantic zones 120, 140 in which the autonomous robot 105 could be located, the autonomous robot 105 compares characteristics that it identified from the image to characteristics of each of the semantic zones 120, 140 of the property 100. For example, because the autonomous robot 105 identified a bed from the image it captured at position (A) of the property, the autonomous robot 105 may look to the mapping hierarchy 150 for a bed in association with either the node 120*a* corresponding to the first bedroom semantic zone 120 or the node 140*a* corresponding to the second bedroom semantic zone 140. In doing so, the autonomous robot 105 may determine that both nodes 120*a*, 140*a* have respective nodes 122*a*, 142*a* for a bed, indicating that both semantic zones 120, 140 have a bed.

Because this information is insufficient to determine in which of the two bedroom semantic zones 120, 140 the autonomous robot 105 is located, the autonomous robot 105 may perform further analysis of the image to determine characteristics of the bed object depicted in the image. For example, the autonomous robot 105 may analyze the image and determine that the bed depicted in the image is white in color. In some instances, such a determination may be sufficient to determine which of the beds 122, 142 are depicted in the image, and therefore to determine if the autonomous robot 105 is located in the first bedroom semantic zone 120 or the second bedroom semantic zone 140. However, because the mapping hierarchy 150 indicates that both of the beds 122, 144 are white, such information is insufficient to distinguish in which of the bedroom semantic zones 120, 140 the autonomous robot 105 is located. In other instances, additional characteristics determined from the image, such as dimensions of the beds 122, 142, whether the beds 122, 142 have posts or a headboard, or other characteristics of the beds 122, 142, may be sufficient to resolve which of the beds 122, 142 is proximate to the autonomous robot 105.

However, in other instances, additional characteristics derived from the image may nevertheless be insufficient for the autonomous robot 105 to determine in which of the bedroom semantic zones 120, 140 it is located. This scenario may especially arise in situations where the autonomous robot 105 is located within semantic areas that typically have rather uniform appearance without significant distinguishing characteristics, such as in corridors of a home, school, or office building. In those instances, the autonomous robot 105 obtain additional information to further resolve in which of multiple candidate semantic zones the autonomous robot 105 is located.

In the example shown in FIG. 1A, the autonomous robot 105 determines whether it is located in the first bedroom semantic zone 120 or the second bedroom semantic zone 140 by obtaining additional information from another portion of the property where it is located. Specifically, as shown in FIG. 1A, the autonomous robot 105 may obtain a second image of a portion of the property 100 from position (B) within the property 100. In some instances, the position (B) and the position (A) may be very close together, or may even be the same position, to avoid a possibility that the autonomous robot 105 moves to a different semantic zone of the property 100. In other examples, such as when the first information obtained from the location of the autonomous robot 105 was obscured by an object, the autonomous robot 105 may travel further from position (A) to position (B) to obtain the additional information. Regardless, the additional image obtained by the autonomous robot 105 will depict a different portion, e.g., be taken from different camera angle, than the first image obtained by the autonomous robot 105.

The autonomous robot 105 analyzes the additional image obtained from position (B) of the property 100, and processes the additional image to identify one or more objects from the additional image. For example, an object recognition engine of the autonomous robot 105 may process the additional image and determine that the additional image obtained from position (B) depicts a plant and a dresser. The autonomous robot 105 may also determine other characteristics of its current location from the additional image. The autonomous robot 105 may access the mapping hierarchy 150 that includes nodes 120*a*, 140*a* for the first bedroom semantic zone 120 and second bedroom semantic zone 140, and may use the additional objects detected from the additional image to identify a particular semantic zone where the autonomous robot 105 is likely located.

For instance, the autonomous robot 105 may access the mapping hierarchy 150 and determine that both the first semantic zone 120 and the second semantic zone 140 include respective dressers 124, 144. However, the autonomous robot 105 may determine, using the mapping hierarchy 150, that while the first bedroom semantic zone 120 is associated with a plant 126, the second bedroom semantic zone 140 is not.

Based on this determination, the autonomous robot 105 may conclude that it is likely located in the first bedroom semantic zone 120, rather than the second semantic zone 140. The autonomous robot 105 may therefore access location information associated with the node 120*a* corresponding to the first bedroom semantic zone 120 that indicates a location of the first bedroom semantic zone 120. The autonomous robot 105 may set as its current location a location associated with the node 120*a*. The autonomous robot 105 has therefore performed localization based on the images obtained from its current location within the property 100 and the mapping hierarchy 150 that specifies the semantic zones 110, 120, 130, 140 of the property 100 and their characteristics.

By using the mapping hierarchy 150, the autonomous robot 105 has increased the efficiency of the localization process. For example, if the autonomous robot 105 only had access to a labelled mapping of the property 100 that indicated the locations of each of the objects within the property 100, the autonomous robot 105 would be required to search throughout the property mapping for a bed object. Such a search would be slower than searching the mapping hierarchy 150, since searching structured data like the mapping hierarchy 150 is more efficient than searching a less structured data like a mapping of the entire property. This search is further optimized by first identifying the semantic zone type where the autonomous robot 105 is located, since by identifying the bedroom semantic zone type the autonomous robot 105 was able to limit its search of the mapping hierarchy 150 to only two of the four semantic zones 120, 140 within the property 100.

Moreover, the added cost of searching an entire mapping of the property 100 to perform localization of the autonomous robot 105 would not guarantee improved accuracy. Rather, the autonomous robot 105 could incorrectly identify the bed 142 located in the second bedroom semantic zone 140 instead of correctly identifying the bed 122 located in the first bedroom semantic zone 120, resulting in an incorrect localization of the autonomous robot 105.

Figure 2:
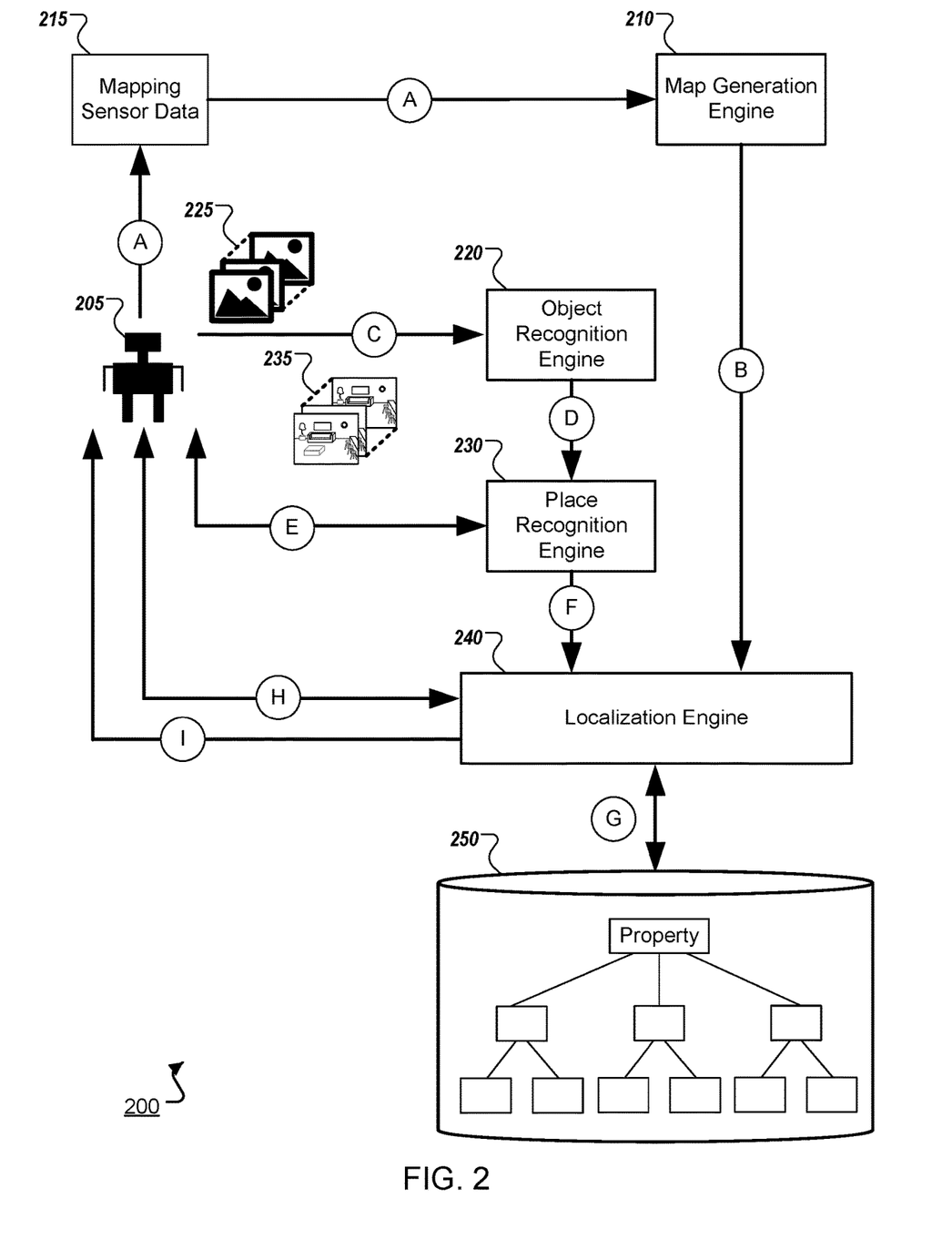
FIG. 2 depicts an example system for performing place recognition and localization.

FIG. 2 depicts an example system 200 for performing place recognition and localization. Briefly, the system 200 includes an autonomous robot 205 in communication with a map generation engine 210, an object recognition engine 220, a place recognition engine 230, and a localization engine 240. Each of the autonomous robot 205, the map generation engine 210, the object recognition engine 220, the place recognition engine 230, and the localization engine 240 may be in communication over one or more wired or wireless connections, for example, over one or more LAN or WAN connections. The system 200 also includes a mapping hierarchy 250, which may be stored in a database or other data storage component, and which may be in communication with the localization engine 240 or other components of the system 200 over one or more wired or wireless connections, for example, over one or more LAN or WAN connections. Each of the map generation engine 210, object recognition engine 220, place recognition engine 230, localization engine 240, or mapping hierarchy 250 may be local to, or remote from, the autonomous robot 205.

In some implementations, the system 200 is configured to enable the autonomous robot 205 to perform place recognition and localization within a property, such as the property 100 of FIG. 1A. The system 200 uses mapping sensor data 215 to generate a mapping of the property that can be used to generate the mapping hierarchy 250.

The system 200 can also obtain image data 225 or other sensor data 235 from the autonomous robot 205. The object recognition engine 220 can process the image data 225 or other sensor data 235 to identify one or more objects represented as being located within a portion of the property depicted by the image data 225 or sensor data 235 where the autonomous robot 205 is located within the property. The place recognition engine 230 can use the objects recognized by the object recognition engine 220 to determine a semantic zone type corresponding to the portion of the property depicted by the image data 225 or sensor data 235. Based on the determined semantic zone type and the mapping hierarchy 250, the localization engine 240 can determine a particular semantic zone of the property specified by the mapping hierarchy 250 in which the autonomous robot 205 is located. The localization engine 240 can send data to the autonomous robot 205 to set a current location of the autonomous robot 205 as a particular location at the property that is associated with the particular semantic zone specified by the mapping hierarchy 250.

At stage (A), one or more autonomous robots, which may optionally include the autonomous robot 205, collect and transmit mapping sensor data 215 to the map generation engine 210. For example, the one or more autonomous robots may be equipped with one or more sensors capable of the taking measurements of the property. For instance, the one or more autonomous robots can be equipped with one or more stereo cameras, LIDAR, radar, sonar, or other forms of imaging or depth detection. An autonomous robot can obtain measurements from the property, where each of the measurements is associated with information about the measurement.

For example, each measurement may indicate a location from which the measurement was taken by the autonomous robot, such as coordinates, latitude and longitude, or other location information that indicates a position of the autonomous robot within the property. The information may also indicate an orientation corresponding to the measurement, such as an indication of a direction from which the measurement was taken and an angle from which the measurement was taken. The measurements taken by the one or more autonomous robots include a sufficient number of measurements to generate a 2D or 3D mapping of the property, or in some implementations, a portion of the property if a mapping of only a portion of the property is desired.

The map generation engine 210 receives the mapping sensor data 215 from the one or more autonomous robots, and generates a mapping of the property that is a 2D or 3D representation of the property. For example, the map generation engine 210 may receive the mapping sensor data 215 that includes the measurements and may use the measurements to determine where surfaces are located within the property. The surfaces may be represented using, for example, polygonal meshes, point clouds, point splatting, or any other form of 3D representation. In some implementations, the mapping of the property may be a 3D representation of the property that represents space within the property, instead of surfaces. For example, the 3D representation may be comprised of a number of 3D cells that each represent a finite amount of volume within the property. The resolution of the three-dimensional representation may be determined as necessary for the particular application. For example, surfaces with more contours may be represented using a higher resolution, e.g., a small polygon size, than surfaces with fewer contours.

In some implementations, the mapping of the property may be a static mapping of the property, i.e., a mapping that is initially determined by the map generation engine 210 and is not further updated. In other implementations, the mapping of the property may be periodically updated, or may be updated based on the one or more autonomous robots determining that the property has sufficiently changed. For example, if furniture within the property is moved, the one or more autonomous robots may determine that the property has sufficiently changed to warrant re-mapping either all or a relevant portion of the property. The one or more autonomous robots may therefore obtain new mapping sensor data 215 and provide that data to the map generation engine 210. The map generation engine 210 may update the mapping of the property based on the new mapping sensor data 215, or may generate a new mapping of the property based on the new mapping sensor data 215 or a combination of the new mapping sensor data 215 and the previously received mapping sensor data 215.

At stage (B), the map generation engine 210 sends the mapping of the property to the localization engine 240. The localization engine 240 receives the mapping of the property and generates the mapping hierarchy 250 of the property based on the mapping.

In some implementations, to generate the mapping hierarchy 250, the localization engine 240 or another component of the system 200 may generate a semantic mapping of the property that labels areas of the mapping as particular semantic zones. However, other non-semantic mappings may be used to generate the mapping hierarchy 250 as well, or the mapping hierarchy 250 may be provided to the system 200, e.g., by one or more users of the property who may upload a semantic mapping of the property to the system 200.

For example, if the system is to generate and use a semantic mapping of the property to generate the mapping hierarchy 250, then instead of providing the mapping directly the localization engine 240, the mapping may be provided to the object recognition engine 220. The object recognition engine 220 may also receive from the one or more autonomous robots, optionally including the autonomous robot 205, image data or other sensor data. For example the image data or other sensor data may be obtained by the one or more autonomous robots and provided to the object recognition engine 220 as described subsequently with respect to stage (C).

The object recognition engine 220 may process the mapping and the image data or other sensor data to label objects within the mapping. For example, the object recognition engine 220 may process the image data or other sensor data to identify one or more objects using the techniques described at stage (C). Corresponding portions of the mapping may be labeled with the identified objects, such as beds, dressers, stoves, or other objects appearing in the property 100 of FIG. 1A. To do so, the images or other sensor data may be associated with locations or perspectives from which the images or other sensor data were collected, such that locations of the objects identified based on the images or other sensor data can be determined and labelled in the mapping of the property. Each object labelled in the mapping may also be associated with a location of the object within the property.

Objects identified in the mapping may also be processed to determine object groups within the property. Object groups may be determined based on identifying groups of objects that are related, i.e., that often appear in the same types of semantic zones. For example, a first group of objects may include a stove, refrigerator, and sink, since those objects frequently appear together in a kitchen semantic zone, and a second group of objects including a bed, dresser, desk, and chair may be identified as a second group of objects since those objects also frequently appear together in a bedroom semantic zone. The groups of objects may also be determined based on other considerations, such as the presence of barriers, e.g., walls, within the property, and the proximity of objects to one another.

Based on the labelled mapping of the property and the object groups identified for the property, semantic zones within the property may be identified and labelled as such to generate a semantic mapping of the property. For example, the localization engine 240 or another component of the system 200 may receive the labelled mapping of the property and information identifying the object groups and may determine semantic zones within the property. For example, the localization engine 240 may determine, for each object group, an area within the property that includes all of the objects within that group. Boundaries of the semantic zones may be defined based on barriers within the property, may be determined such that any semantic area within the property does not overlap any other semantic area within the property, or may be determined such that all areas within the property are labelled as being a part of a semantic zone.

In some implementations, identification of the objects by the object recognition engine 220, or of the semantic zones of the semantic mapping, may be generated by or determined based on outputs of one or more artificial neural networks, such as one or more deep convolutional neural networks. For example, a neural network may receive the mapping of the property, the image data 225 or the other sensor data 235 and may generate or output data usable to determine an object mapping of the property. The object mapping may be provided to another neural network, which may generate or output data usable to determine the semantic mapping of the property.

Using the mapping generated by the map generation engine 210, a semantic mapping of the property, or another mapping of the property, e.g., the mapping of the property that includes labels for objects within the property, the localization engine 240 can generate the mapping hierarchy 250. For example, the localization engine 240 may process a mapping of the property, and identify as a second level of nodes below a head node of the mapping hierarchy 250 one or more semantic zones of the property. The localization engine 240 may identify objects within each of the semantic zones of the property, and may assign nodes in a third level of the mapping hierarchy 250 corresponding to each of the identified objects, which each relate to a node in the second level of the mapping hierarchy 250 that is determined based upon the semantic zone in which the object is located. Other characteristics of the objects in the property may be identified in fourth and lower levels of the mapping hierarchy 250. Characteristics of the objects may include, for example, colors, sizes, shapes, orientations, positions relative to other objects, or other characteristics of the objects.

In some implementations, various other characteristics of the semantic zones of the property may be represented in the mapping hierarchy 250. For example, colors or textures of barriers such as walls, ambient light levels, temperatures, noise levels, dimensions of semantic zones, positions of objects relative to other objects within semantic zones, or other characteristics may be determined and incorporated into the mapping hierarchy 250. The mapping hierarchy 250 can be sufficiently detailed to enable a particular semantic zone of the property to be identified based on image data 225 or other sensor data 235 obtained by the autonomous robot 205.

While described predominantly as a mapping hierarchy 250 having a multi-layered structure of related information, in some instances, the mapping hierarchy may be replaced in the system 200 by another data structure that can be similarly used by the components of the system 200 to perform localization. For example, a knowledge graph, linked list, or other data structure that organizes the semantic zones and characteristics of a property may be implemented in the system 200 and used to perform localization in much the same way as the proposed mapping hierarchy 250.

At stage (C), the autonomous robot 205 begins the localization process. To do so, the autonomous robot 205 obtains and transmits image data 225 or other sensor data 235 to the object recognition engine 220. For example, as shown at FIG. 1A, the autonomous robot 205 can obtain one or more images 225 of a portion of the property using a camera of the autonomous robot 205 while the autonomous robot 205 is located at a particular position within the property. In some implementations, the autonomous robot 205 may obtain additional or different sensor data 235, and may transmit that additional or different sensor data 235 to the object recognition engine 220. The other sensor data 235 can include, for example, LIDAR, radar, sonar, stereo camera images, or other imaging or depth sensing measurements. In some implementations, the mapping sensor data 215 may include all or a portion of the image data 225 or the other sensor data 235 obtained by the autonomous robot 205 while located at the particular position of the property. In those implementations, the object mapping engine 220 may receive the image data 225 or other sensor data 235 from the map generation engine 210 in place of, or in addition to, receiving image data 225 or additional sensor data 235 from the autonomous robot 205.

The received image data 225 or other sensor data 235 can be sufficient to identify one or more objects that the image data 225 or other sensor data 235 represent as being located within the portion of the property where the autonomous robot 205 is located. For example, the image data 225 may include one or more images from a room of the property where the autonomous robot 205 is currently located that feature objects positioned in the room of the property. In other examples, the other sensor data 235 may include a sufficient number of measurements obtained from the room of the property where the autonomous robot 205 is current located to identify objects positioned within the room of the property.

To identify objects from the image data 225 or the other sensor data 235, the object recognition engine 220 may identify objects based on the geometry of objects identified in the image data 225 or the other sensor data 235. For example, the object recognition engine 220 may have access to one or more object templates or object features templates that specify features of objects or parts of objects. The object recognition engine 220 may compare features derived from the image data 225 or the other sensor data 235 to identify one or more objects depicted by the image data 225 or the other sensor data 235. In some examples, objects may be described by object constellation models in which objects are described by features that are geometrically related, e.g., a particular object is described by features that are positioned relative to one another. The object recognition engine 220 may identify an object based on identifying the features of a particular object and determining that the position of those features relative to one another satisfies the object constellation model.

The object recognition engine 220 may consider other information in identifying objects. For example, the object recognition engine 220 may consider the likely positioning of a particular object within a room, such that an object that resembles both a table and cabinet but that is attached to a ceiling will be identified as a cabinet, since it is unlikely that a table would be attached to the ceiling. The object recognition engine 220 may also consider the proximity of other identified objects when identifying objects. For example, an object that could be identified as either a television or a microwave but that is positioned near an object identified as a refrigerator may be identified as a microwave, because it is more likely for a microwave to be near a refrigerator than a television. Other methods of object identification may also be implemented by the object recognition engine 220.

At step (D), the object recognition engine 220 provides the place recognition engine 230 with data indicating one or more objects identified from the image data 225 or other sensor data 235. The place recognition engine 230 receives the one or more objects and performs place recognition to determine a semantic zone type where the autonomous robot 205 is currently located. For example, the object recognition engine 220 may provide information to the place recognition engine 230 indicating that image data 225 obtained by the autonomous robot 205 depicts a bed, and based on that information the place recognition engine 230 may identify a semantic zone type of the position within the property where the autonomous robot 205 is currently located.

In some implementations, the place recognition engine 230 may identify the semantic zone type based on information indicating one or more objects identified by the object recognition engine 220, or based on information indicating confidences that the object recognition engine 220 has identified different objects.

For example, the place recognition engine 230 may receive information indicating that the object recognition engine 230 has identified both a bed and a desk and chair in image data 225 obtained by the autonomous robot 205. The place recognition engine 230 may process the information and may determine that it is more likely that the objects correspond to a bedroom semantic zone type over a home office semantic zone type, for example, because it is more likely for a desk to be located in a bedroom semantic zone than for a bed to be located in a home office semantic zone. In another example, the place recognition engine 230 may receive information indicating a high confidence that the object recognition engine 220 has identified a first object as a stove, and indicating a medium confidence that the object recognition engine 220 has identified a second object as either a microwave or a television. The place recognition engine 220 may process the information and identify a kitchen semantic zone type over a living room semantic zone type, based on the confidence information.

However, in some instances, the object recognition engine 220 may receive image data 225 or other sensor data 235 that is insufficient to identify objects, such that the place recognition engine 230 cannot identify a semantic zone type. Alternatively the object recognition engine 220 may identify objects from the image data 225 or other sensor data 235, but the identified images may be insufficient for the place recognition engine 230 to determine a specific semantic zone type. For example, the place recognition engine 230 may receive information from the object recognition engine 220 indicating a chair, however, that indication may be insufficient for the place recognition engine 230 to determine with sufficient confidence that the autonomous robot 205 is positioned within a specific type of semantic zone.

In this case, at stage (E), the place recognition engine 230 may transmit a request to the autonomous robot 205 for the autonomous robot 205 to provide additional image data 225 or additional other sensor data 235 to the object recognition engine 220. In response, the autonomous robot 205 may obtain additional image data 225 or additional other sensor data 235, and provide that additional information to the object recognition engine 220 for additional processing. The place recognition engine 230 may receive information indicating additional objects detected by the object recognition engine 220. The additional objects identified by the object recognition engine 220 may be sufficient for the place recognition engine 230 to determine a semantic zone type of the position within the property where the autonomous robot 205 is currently located.

For example, based on the place recognition engine 230 receiving information indicating that the object recognition engine 220 has not identified an object, the place recognition engine 230 may send a request to the autonomous robot 205 for additional image data 225 or additional other sensor data 235. As with the autonomous robot 105 of FIG. 1A taking an additional image at position (B) within the property, the autonomous robot 205 may obtain and provide the object recognition engine 220 with additional image data 225 or additional object data 235. The object recognition engine 220 may identify one or more objects based on this additional information that are sufficient for the place recognition engine 230 to determine a semantic zone type of the position within the property where the autonomous robot 205 is currently located.

At stage (F), the place recognition engine 230 provides information indicating the determined semantic zone type to the localization engine 240. At stage (G), the localization engine 240 accesses the mapping hierarchy 250. Based on the determined semantic zone type and the mapping hierarchy 250, the localization engine 240 can identify a particular semantic zone of the property where the autonomous robot 205 is currently located.

For example, using the example of FIGS. 1A and 1B, the localization engine 240 may receive information indicating a kitchen semantic zone type. The localization engine 240 may access the mapping hierarchy 250 and determine that the mapping hierarchy 250 includes only a single kitchen semantic zone. As a result, the localization engine 240 can determine that the autonomous robot 205 is located in the kitchen semantic zone of the property.

While this may be sufficient when the mapping hierarchy 250 only includes one semantic zone of the determined semantic zone type, the localization engine 240 may rely on additional information when the mapping hierarchy includes more than one semantic zone of the determined semantic zone type, as discussed with respect to FIGS. 1A and 1B. In those instances, the localization engine 240 may receive additional information from object recognition engine 220 or another component of the system 200. For example, the localization engine 240 may receive information indicating, or may determine based on received information, one or more characteristics that are determined based on the image data 225 or other sensor data 235.

The determined characteristics may indicate, for example, one or more objects that are identified based on the image data 225 or other sensor data 235, so that the localization engine 240 may determine if any of the identified objects is unique to a semantic zone of the determined semantic zone type. In those instances, knowing the identified unique object could be sufficient for the localization engine 240 to disambiguate between the multiple semantic zones and to select a particular semantic zone of the determined semantic zone type where the autonomous robot 205 is currently located.

In other examples, additional characteristics may be required. Such characteristics may include, for example, dimensions of identified objects, colors of identified objects, shapes of identified objects, positions of identified objects relative to one another or relative to other structures within the semantic zone, or other characteristics of the objects. Additionally or alternatively, the characteristics may include other characteristics determined based on the image data 225 or other sensor data 235 that is not specific to an identified object. For example, characteristics such as the colors of walls, a temperature detected at the location of the autonomous robot 205, ambient noise from the location of the autonomous robot 205, dimensions of a space where the autonomous robot 205 is located, or other characteristics may be used to disambiguate from among the candidate semantic zones of the determined semantic zone type.

In other examples, the localization engine 240 may be able to compare features, such as surface renderings or other representations, of objects or of portions of a semantic zone represented in the image data 225 or other sensor data 235 with features of objects or portions of the candidate semantic zones of the determined semantic zone type, and may be able to disambiguate the semantic zone where the autonomous robot 205 is located based on the comparison. Where such characteristics or other analyses are necessary for the localization engine 240 to determine the particular semantic zone in which the autonomous robot 205 is currently located, the localization engine 240 may receive such information from one or more other components of the system 200. For example, the object recognition engine 220 may provide the localization engine 240 with a surface rendering of a portion of the property depicted in an image obtained by the autonomous robot 205, and the localization engine 240 may compare the received surface rendering to surface renderings of portions of the candidate semantic zones of the particular semantic zone type.

In some implementations, the localization engine 240 may determine that has insufficient information to determine a particular semantic zone in which the autonomous robot 205 is located. For example, the localization engine 240 may receive information indicating that the autonomous robot 205 is located in a semantic zone that is of a bedroom semantic zone type, such as one of the semantic zones 120, 140 of FIG. 1A, but may have insufficient information to determine a particular bedroom semantic zone where the autonomous robot 205 is located.

In response to such determinations, at stage (H), the localization engine 240 may transmit a request to the autonomous robot 205 for additional image data 225 or additional other sensor data 235. In response to the request, the autonomous robot 205 may obtain and transmit to one or more other components of the system 200 additional image data 225 or additional other sensor data 235. The additional image data 225 or additional other sensor data 235 may provide additional characteristics of the portion of the property where the autonomous robot 205 is currently located to enable the localization engine 240 to determine a particular semantic zone where the autonomous robot 205 is currently located.

Based on determining the particular semantic zone where the autonomous robot 205 is currently located, the localization engine 240 can determine a location of the autonomous robot 205. For example, the particular semantic zone may have a location within the property that is specified by the mapping hierarchy 250. The location may be, for example, coordinates or a latitude and longitude corresponding to a center, entrance, or other point of interest of the particular semantic zone.

In other implementations, the localization engine 240 may further refine the location of the autonomous robot 205 within the particular semantic zone. For example, the localization engine 240 may use image data 225 or other sensor data 235, such as range measurements and an orientation of the autonomous robot 205, to further refine a location of the autonomous robot 205 within the space. Such refinement may be especially possible when, for example, the localization engine 240 has access to the mapping of the property that specifies coordinates of objects or barriers of the semantic zone.

At stage (I), the localization engine 240 transmits information to the autonomous robot 205 to set a current location of the autonomous robot 205. For example, the localization engine 240 can transmit information to the autonomous robot 205 that indicates the location determined by the localization engine 240. The autonomous robot 205 can receive the information and set its current location based on the received information to complete the localization process.

Figure 3:
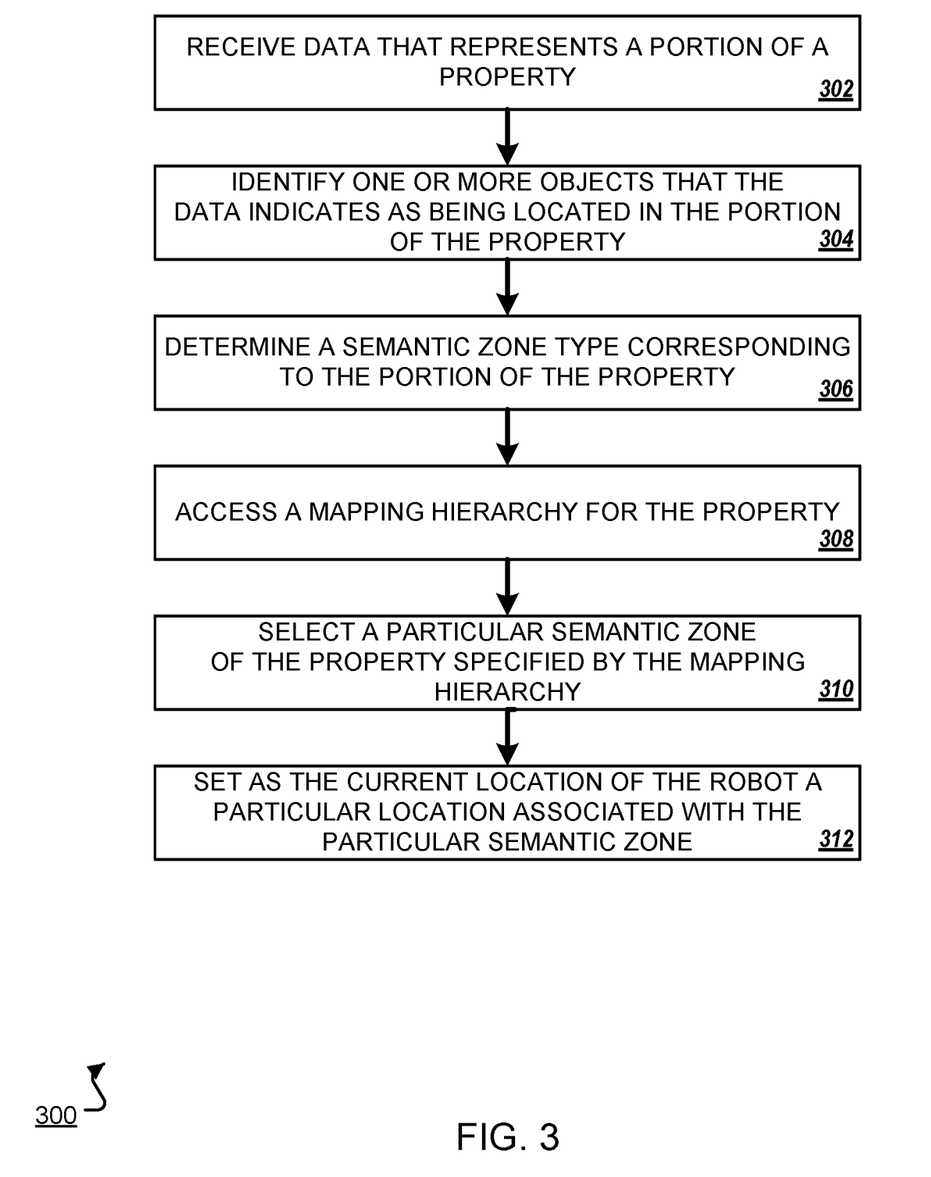
FIG. 3 is a flowchart of an example process for performing place recognition and localization.

FIG. 3 is a flowchart of an example process 300 for performing place recognition and localization. In some implementations, the example process 300 may be performed by the system 200 of FIG. 2.

The system receives data that represents a portion of a property and that was obtained using one or more sensors of a robot while located at a particular position of the property (302). For example, the object recognition engine 220 of the system 200 can receive from the autonomous robot 205 image data 225 or other sensor data 235 that represents a portion of a property where the autonomous robot 205 is currently located.

The system identifies, based at least on the data that represents the portion of the property and that was obtained using the one or more sensors of the robot while located at the particular position of the property, one or more objects that the data indicates as being located within the portion of the property (304). For instance, based on the image data 225 or other sensor data 235, the object recognition engine 220 can identify one or more objects, where the one or more objects are located within the portion of the property captured by the autonomous robot 205 while located at the particular location within the property.

The system determines, based at least on the one or more objects that the data indicates as being located within the portion of the property, a semantic zone type corresponding to the portion of the property (306). For example, the object recognition engine 220 can transmit data to the place recognition engine 230 that indicates one or more objects that the object recognition engine 220 identified based on the image data 225 or the other sensor data 235. The place recognition engine 230 use the data indicating the one or more objects to determine a semantic zone type of the location where the autonomous robot 205 is currently located.

The system accesses a mapping hierarchy for the property (308). The mapping hierarchy for the property specifies one or more semantic zones of the property that each have a corresponding semantic zone type and that are each associated with a location at the property. The mapping hierarchy also specifies, for each of the one or more semantic zones of the property, one or more characteristics of the semantic zone of the property. For instance, the place recognition engine 230 can transmit data to the localization engine 240 that indicates the semantic zone type of the location where the autonomous robot 205 is currently located. The localization engine 240 can receive the data indicating the semantic zone type and can access the mapping hierarchy 250 of the property. The mapping hierarchy 250 of the property specifies one or more semantic zones of the property that are each associated with a particular location within the property, and that are each also associated with one or more characteristics of the semantic zone of the property. Characteristics of each semantic zone may include, for example, objects located within each semantic zone, characteristics of the objects located within each semantic zone, or other characteristics pertaining to the semantic zone that may or may not relate to the specific objects located within each semantic zone.

The system selects, from among the one or more semantic zones of the property specified by the mapping hierarchy, a particular semantic zone of the property specified by the mapping hierarchy (310). The selection is based at least on the semantic zone type corresponding to the portion of the property and at least a portion of the data that represents the portion of the property and that was obtained using the one or more sensors of the robot while located at the particular position of the property. For example, the localization engine 240 can identify one or more candidate semantic zones specified by the mapping hierarchy 250 that are of the particular semantic zone type of the location where the autonomous robot 205 is currently located. From among these candidate semantic zones, and based on the image data 225 or other sensor data 235, or information derived from the image data 225 or other sensor data 235 such as objects identified in the portion of the property where the autonomous robot 205 is currently located, the localization engine 240 selects a particular semantic zone.

The system sets, as a current location of the robot at the property, a particular location at the property associated with the particular semantic zone of the property specified by the mapping hierarchy (312). For example, the localization engine 240 can identify a location at the property that is specified by the mapping hierarchy 250 and that is associated with the selected semantic zone. The localization engine 240 can transmit set, or can transmit data to the autonomous robot 205 that sets, a current location of the autonomous robot 205 to the identified location at the property.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development or processing of speech inputs for use with applications installed on user devices, the described features may also be used with respect to machines, other devices, robots, or other systems. For example, the described systems and methods may be used to improve user interactions with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:

receiving a sensor-based representation of a portion of a property, wherein the sensor-based representation of the portion of the property is derived from observations of the portion of the property that were obtained using one or more sensors of a robot while the robot was located at an unknown location of the property;

identifying, based at least on the sensor-based representation of the portion of the property, one or more objects that the sensor-based representation indicates as being located within the portion of the property;

determining, based at least on the one or more objects that the sensor-based representation indicates as being located within the portion of the property, a semantic zone type for the portion of the property;

accessing a model of the property that identifies (i) a plurality of semantic zones of the property, and (ii) for each semantic zone of the property, a corresponding semantic zone type for the semantic zone of the property and a corresponding location for the semantic zone of the property; and selecting, from among the plurality of semantic zones of the property identified by the model, a particular semantic zone of the property where the robot was likely located when the observations of the portion of the property were obtained using the one or more sensors of the robot, wherein selecting the particular semantic zone comprises identifying a match between the determined semantic zone type for the portion of the property and the corresponding semantic zone type that is indicated by the model of the property for the particular semantic zone; and setting, as a current location of the robot at the property, a particular location within the particular semantic zone of the property where the robot was likely located when the observations of the portion of the property were obtained using the one or more sensors of the robot.

2. The computer-implemented method of claim 1, wherein the observations of the portion of the property comprise one or more images of the portion of the property.

3. The computer-implemented method of claim 1, wherein the observations of the portion of the property comprise a plurality of LIDAR measurements obtained from the portion of the property.

4. The computer-implemented method of claim 1, wherein determining the semantic zone type for the portion of the property comprises:

determining that the one or more objects that the sensor-based representation indicates as being located within the portion of the property is insufficient to determine a semantic zone type for the portion of the property;

receiving a second sensor-based representation of a different portion of the property, wherein the second sensor-based representation of the different portion of the property is derived from observations of the different portion of the property that were obtained using the one or more sensors of the robot;

identifying, based at least on the second sensor-based representation of the different portion of the property, one or more additional objects that the second sensor-based representation indicates as being located within the different portion of the property; and determining, based at least on (i) the one or more objects that the sensor-based representation of the portion of the property indicates as being located within the portion of the property and (ii) the one or more additional objects that the second sensor-based representation indicates as being located within the different portion of the property, the semantic zone type for the portion of the property.

5. The computer-implemented method of claim 1, wherein selecting the particular semantic zone of the property comprises:

identifying, using the model of the property, that the determined semantic zone type for the portion of the property matches the corresponding semantic zone type for multiple ones of the plurality of semantic zones of the property;

determining one or more characteristics of the portion of the property based on the sensor-based representation of the portion of the property;

comparing the one or more characteristics of the portion of the property to the corresponding characteristics of the multiple ones of the plurality of semantic zones of the property that were identified as having a semantic zone type that matches the determined semantic zone type for the portion of the property; and determining, based at least on a result of the comparison, that the robot was likely located in the particular semantic zone of the property when the observations of the portion of the property were obtained using the one or more sensors of the robot.

6. The computer-implemented method of claim 5 wherein the corresponding characteristics of the multiple ones of the plurality of semantic zones of the property comprise indications of objects that are registered as being located in corresponding ones of the semantic zones of the property, and comparing the one or more characteristics of the portion of the property to the corresponding characteristics of the multiple ones of the plurality of semantic zones of the property comprises comparing objects identified in the portion of the property to the objects that have been registered as being located in the corresponding ones of the semantic zones of the property.

7. The computer-implemented method of claim 5, wherein the corresponding characteristics of the multiple ones of the plurality of semantic zones of the property comprise corresponding three-dimensional representations of each of the multiple ones of the plurality of semantic zones of the property.

8. The computer-implemented method of claim 7, wherein selecting the particular semantic zone of the property comprises:

determining, based at least on the sensor-based representation of the portion of the property, a three-dimensional representation of the portion of the property; and comparing the three-dimensional representation of the portion of the property to the corresponding three-dimensional representations of the multiple ones of the plurality of semantic zones of the property.

9. A system comprising:
one or more processors configured to execute computer program instructions; and
one or more non-transitory computer-storage media encoded with computer programs that, when executed by the processor, cause the system to perform operations comprising:
receiving a sensor-based representation of a portion of a property, wherein the sensor-based representation of the portion of the property is derived from observations of the portion of the property that were obtained using one or more sensors of a robot while the robot was located at a particular position an unknown location of the property;
identifying, based at least on the sensor-based representation of the portion of the property, one or more objects that the sensor-based representation indicates as being located within the portion of the property;
determining, based at least on the one or more objects that the sensor-based representation indicates as being located within the portion of the property, a semantic zone type for the portion of the property;
accessing a model of the property that identifies (i) a plurality of semantic zones of the property, and (ii) for each semantic zone of the property, a corresponding semantic zone type for the semantic zone of the property and a corresponding location for the semantic zone of the property; and
selecting, from among the plurality of semantic zones of the property identified by the model, a particular semantic zone of the property where the robot was likely located when the observations of the portion of the property were obtained using the one or more sensors of the robot, wherein selecting the particular semantic zone comprises identifying a match between the determined semantic zone type for the portion of the property and the corresponding semantic zone type that is indicated by the model of the property for the particular semantic zone; and
setting, as a current location of the robot at the property, a particular location within the particular semantic zone of the property where the robot was likely located when the observations of the portion of the property were obtained using the one or more sensors of the robot.

10. The system of claim 9, wherein the observations of the portion of the property comprise one or more images of the portion of the property.

11. The system of claim 9, wherein the observations of the portion of the property comprise a plurality of LIDAR measurements obtained from the portion of the property.

12. The system of claim 9, wherein determining the semantic zone type for the portion of the property comprises:
determining that the one or more objects that the sensor-based representation indicates as being located within the portion of the property is insufficient to determine a semantic zone type for the portion of the property;
receiving a second sensor-based representation of a different portion of the property, wherein the second sensor-based representation of the different portion of the property is derived from observations of the different portion of the property that were obtained using the one or more sensors of the robot;
identifying, based at least on the second sensor-based representation of the different portion of the property, one or more additional objects that the second sensor-based representation indicates as being located within the different portion of the property; and
determining, based at least on (i) the one or more objects that the sensor-based representation of the portion of the property indicates as being located within the portion of the property and (ii) the one or more additional objects that the second sensor-based representation indicates as being located within the different portion of the property, the semantic zone type for the portion of the property.

13. The system of claim 9, wherein selecting the particular semantic zone of the property comprises:
identifying, using the model of the property, that the determined semantic zone type for the portion of the property matches the corresponding semantic zone type for multiple ones of the plurality of semantic zones of the property;
determining one or more characteristics of the portion of the property based on the sensor-based representation of the portion of the property;
comparing the one or more characteristics of the portion of the property to corresponding characteristics of the multiple ones of the plurality of semantic zones of the property that were identified as having a semantic zone type that matches the determined semantic zone type for the portion of the property; and determining, based at least on a result of the comparison, that the robot was likely located in the particular semantic zone of the property when the observations of the portion of the property were obtained using the one or more sensors of the robot.

14. The system of claim 9, wherein the corresponding characteristics of the multiple ones of the plurality of semantic zones of the property comprise corresponding three-dimensional representations of each of the multiple ones of the plurality of semantic zones of the property.

15. One or more non-transitory computer-readable devices storing software comprising instructions executable by one or more computers which, upon such execution, cause the one or more computers to perform operations comprising:
receiving a sensor-based representation of a portion of a property, wherein the sensor-based representation of the portion of the property is derived from observations of the portion of the property that were obtained using one or more sensors of a robot while the robot was located at an unknown location of the property;
identifying, based at least on the sensor-based representation of the portion of the property, one or more objects that the sensor-based representation indicates as being located within the portion of the property;
determining, based at least on the one or more objects that the sensor-based representation indicates as being located within the portion of the property, a semantic zone type for the portion of the property;
accessing a model of the property that identifies (i) a plurality of semantic zones of the property, and (ii) for each semantic zone of the property, a corresponding semantic zone type for the semantic zone of the property and a corresponding location for the semantic zone of the property; and
selecting, from among the plurality of semantic zones of the property identified by the model, a particular semantic zone of the property where the robot was likely located when the observations of the portion of the property were obtained using the one or more sensors of the robot, wherein selecting the particular semantic zone comprises identifying a match between the determined semantic zone type for the portion of the property and the corresponding semantic zone type that is indicated by the model of the property for the particular semantic zone; and setting, as a current location of the robot at the property, a particular location within the particular semantic zone of the property where the robot was likely located when the observations of the portion of the property were obtained using the one or more sensors of the robot.

16. The one or more non-transitory computer-readable devices of claim 15, wherein the observations of the portion of the property comprise one or more images of the portion of the property.

17. The one or more non-transitory computer-readable devices of claim 15, wherein the observations of the portion of the property comprise a plurality of LIDAR measurements obtained from the portion of the property.

18. The one or more non-transitory computer-readable devices of claim 15, wherein determining the semantic zone type for the portion of the property comprises:
   determining that the one or more objects that the sensor-based representation indicates as being located within the portion of the property is insufficient to determine a semantic zone type for the portion of the property;
   receiving a second sensor-based representation of a different portion of the property, wherein the second sensor-based representation of the different portion of the property is derived from observations of the different portion of the property that were obtained using the one or more sensors of the robot;
   identifying, based at least on the second sensor-based representation of the different portion of the property, one or more additional objects that the second sensor-based representation indicates as being located within the different portion of the property; and
   determining, based at least on (i) the one or more objects that the sensor-based representation of the portion of the property indicates as being located within the portion of the property and (ii) the one or more additional objects that the second sensor-based representation indicates as being located within the different portion of the property, the semantic zone type for the portion of the property.

19. The one or more non-transitory computer-readable devices of claim 15, wherein selecting the particular semantic zone of the property comprises:
   identifying, using the model of the property, that the determined semantic zone type for the portion of the property matches the corresponding semantic zone type for multiple ones of the plurality of semantic zones of the property;
   determining one or more characteristics of the portion of the property based on the sensor-based representation of the portion of the property;
   comparing the one or more characteristics of the portion of the property to corresponding characteristics of the multiple ones of the plurality of semantic zones of the property that were identified as having a semantic zone type that matches the determined semantic zone type for the portion of the property; and
   determining, based at least on a result of the comparison, that the robot was likely located in the particular semantic zone of the property when the observations of the portion of the property were obtained using the one or more sensors of the robot.

20. The one or more non-transitory computer-readable devices of claim 19, wherein the corresponding characteristics of the multiple ones of the plurality of semantic zones of the property comprise indications of objects that are registered as being located in corresponding ones of the semantic zones of the property, and comparing the one or more characteristics of the portion of the property to the corresponding characteristics of the multiple ones of the plurality of semantic zones of the property comprises comparing objects identified in the portion of the property to the objects that have been registered as being located in the corresponding ones of the semantic zones of the property.

* * * * *